United States Patent
Takizawa et al.

(10) Patent No.: US 8,190,995 B2
(45) Date of Patent: May 29, 2012

(54) INFORMATION PROCESSING APPARATUS AND INFORMATION SELECTING METHOD

(75) Inventors: Akihiko Takizawa, Ota (JP); Wataru Oikubo, Nerima (JP); Syu Takahara, Yokohama (JP); Hironaga Ogawa, Yokohama (JP); Hidetoshi Kadoya, Edogawa (JP)

(73) Assignee: Alpine Electronics, Inc., Tokyo (JP)

( * ) Notice: Subject to any disclaimer, the term of this patent is extended or adjusted under 35 U.S.C. 154(b) by 429 days.

(21) Appl. No.: 12/505,777

(22) Filed: Jul. 20, 2009

(65) Prior Publication Data

US 2010/0100647 A1 Apr. 22, 2010

(30) Foreign Application Priority Data

Oct. 20, 2008 (JP) ................................. 2008-269380

(51) Int. Cl.
*G06F 15/00* (2006.01)
*G06F 13/00* (2006.01)

(52) U.S. Cl. ...................................... 715/727; 715/728

(58) Field of Classification Search .......... 715/763–765, 715/851–853, 840, 727–728, 726, 730, 719–720
See application file for complete search history.

(56) References Cited

U.S. PATENT DOCUMENTS

| 5,293,163 | A | * | 3/1994 | Kakihara et al. | 340/995.13 |
| 6,846,979 | B2 | | 1/2005 | Kondo | |
| 2005/0251331 | A1 | * | 11/2005 | Kreft | 701/207 |
| 2006/0293847 | A1 | * | 12/2006 | Marriott et al. | 701/212 |
| 2007/0255464 | A1 | * | 11/2007 | Singh et al. | 701/36 |

FOREIGN PATENT DOCUMENTS

| JP | 10-141974 | 5/1998 |
| JP | 2002-230951 | 8/2002 |

* cited by examiner

*Primary Examiner* — Cao "Kevin" Nguyen
(74) *Attorney, Agent, or Firm* — Brinks Hofer Gilson & Lione

(57) ABSTRACT

An information processing apparatus and an information selecting method are disclosed which can easily restore an original state after checking the result of executing predetermined processing based on different information. If an operator of an operation unit is pressed in an already processed state where a processing execution unit is executing predetermined processing using already selected information set in a selected information memory, information assigned to the operator is newly set in the selected information memory to execute the predetermined processing with the processing execution unit. After that, if the pressed operator is released, the processing execution unit is restored to the already processed state. With this operation, after checking a new processing state using different information from already selected information by pressing an operator, the already processed state can be restored simply by releasing the pressed operator.

20 Claims, 7 Drawing Sheets

INFORMATION PROCESSING APPARATUS AND INFORMATION SELECTING METHOD

BACKGROUND OF THE INVENTION

1. Related Applications

The present application claims priority to Japanese Patent Application Number 2008-269380, filed Oct. 20, 2008, the entirety of which is hereby incorporated by reference.

2. Field of the Invention

The present invention relates to an information processing apparatus and an information selecting method, and more specifically to an information processing apparatus having a function of selecting desired information from plural pieces of information with plural switches to execute predetermined processing using the selected information.

3. Description of the Related Art

Most electronic devices need to select information necessary for a target operation as a premise for the operation. In addition, the devices may select information to realize a variety of operations. Considering a television broadcast receiver as an example of an electronic device, the device needs to select a channel desired by a user (as information necessary for a broadcast reception operation) as a premise for television viewing. Further, considering a navigation system as an example of an electronic device, the system can select a scale at which a map is displayed (information that produces display variations in a map display operation).

To select such information, most electronic devices are equipped with an operation unit for selecting information. Examples of the operation unit include a GUI (graphical user interface) or TUI (text user interface) realized by software, and various types of switches or a touch panel realized by hardware. For example, the navigation system is provided with various switches and buttons on a casing as an operation unit for selecting information. The touch panel may be disposed in place of the switches or the like. Hitherto, various operation methods have been devised with a view to enhancing the convenience of user operations as disclosed in, for example, Japanese Unexamined Patent Application Publication Nos. 10-141974 and 2002-230951.

According to the invention as disclosed in Japanese Unexamined Patent Application Publication No. 10-141974, a selection menu for a scale pops up if a user touches a desired point on a map displayed on a screen with a touch panel with his finger for a predetermined period. Then, if the user sweeps the finger over the touch panel and takes the finger off at a position corresponding to a desired scale level out of plural scale levels in a popup menu, the scale level at the position in which the finger is released is selected and the map is displayed at this scale level.

Further, according to the invention as disclosed in Japanese Unexamined Patent Application Publication No. 2002-230951, a first bar including elements corresponding to plural pieces of providable information is displayed in a display area with a touch panel. When a user touches a desired portion on the first bar, a control unit extracts the numbers of songs in the user-touched portion and its surroundings (for example, plural song numbers including a number corresponding to the user-selected position) to update the display screen to display a second bar that allows selection of each of these song numbers. Then, a song of the song number which is selected by a user on the second bar is played back.

However, in the known techniques disclosed in Japanese Unexamined Patent Application Publication Nos. 10-141974 and 2002-230951, some devices are made on an operation method for selecting information but no devices are made on an operation method for cancelling selection. This will be described hereafter taking the case of selecting a scale to display a map as an example. In the navigation system, a desired scale selected by a user is set to display a map, and the map is displayed at the preset scale unless otherwise changed.

Here, the user sometimes wants to check a detailed map at a large scale or check a wide area map at a reduced scale. In such cases, the user changes the scale. By selecting a desired scale to display a map through this scale change operation, the user can obtain needed information on the detailed map or the wide area map displayed thereby. After the needed information is obtained, the scale is generally returned to the original one. However, the user needs to change the scale once again in a similar (or opposite) manner to the above. This operation is very troublesome.

SUMMARY

The present invention has been accomplished with a view to solving the above problems, and it is accordingly an object of one embodiment of the present invention to restore the original state with ease after confirming the result of executing predetermined processing using selected information different from the original information.

To attain the above object, if it is detected that, during an already processed state where predetermined processing is being executed using already selected information, any of the operators is pressed, predetermined processing is performed using the newly-set information, operator-specific information assigned to the pressed operator, to thereby set a new processing state. After that, if it is detected that a confirmation operation is performed in order to confirm the selection of the operator-specific information, the selection of the operator-specific information is automatically confirmed. On the other hand, if no confirmation operation is performed and the operator is released from the pressed state, the processing state is restored to the already processed state.

According to the above structure, if a pressing operation is performed to bring an operator into a pressed state, a new processing state can be checked using information different from already selected information. Only by taking the operator into an unpressed state (releasing the pressed state) after checking the new processing state, the already processed state can be restored, thereby making it unnecessary to perform a troublesome operation to restore the already processed state. Accordingly, the original state can be restored with ease after checking the result of executing predetermined processing using selected information different from the original information.

DESCRIPTION OF THE PREFERRED EMBODIMENTS

Figure 1:
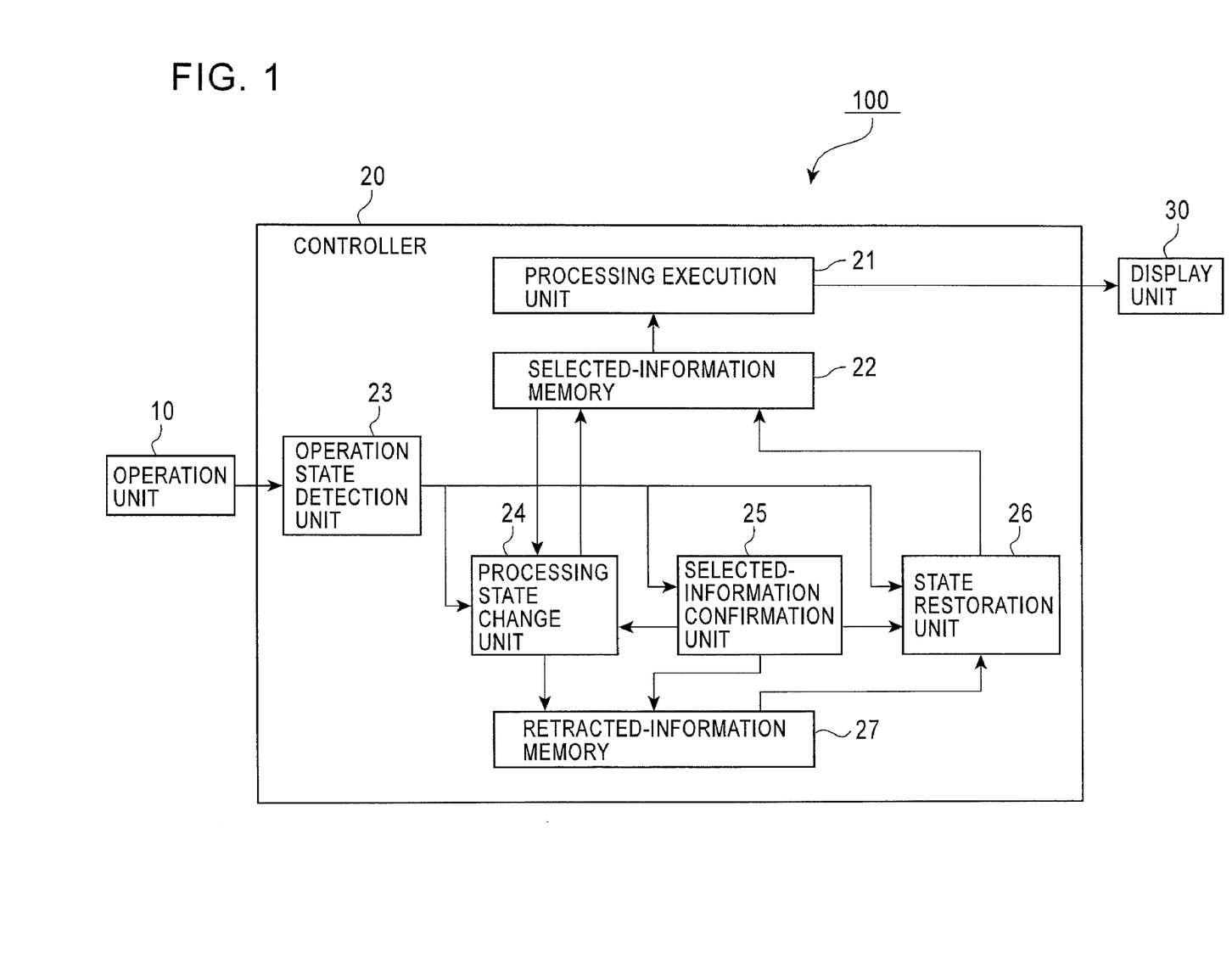
FIG. 1 is a block diagram of an example of an information processing apparatus according to an embodiment of the present invention.

Hereinafter, an embodiment of the present invention will be described with reference to the accompanying drawings. FIG. 1 is a block diagram of an example of an information processing apparatus according to the first embodiment of the present invention. In the following description, a navigation system is taken as an example. The navigation system of this embodiment has a function of displaying a map image (hereinafter simply referred to as a "map") at a scale selected by a user.

As shown in FIG. 1, an information processing apparatus (navigation system) 100 of this embodiment includes an operation unit 10, a controller 20, and a display unit 30. The controller 20 is equipped with, for example, a CPU or MPU, a RAM, a ROM, and the like and is configured to prompt the CPU to operate in accordance with a program stored in the ROM, for example, to thereby realize various functions. Functional elements of the controller 20 are a processing execution unit 21, a selected-information memory 22, an operation state detection unit 23, a processing state change unit 24, a selected-information confirmation unit 25, a state restoration unit 26, and a retracted-information memory 27.

Figure 2:
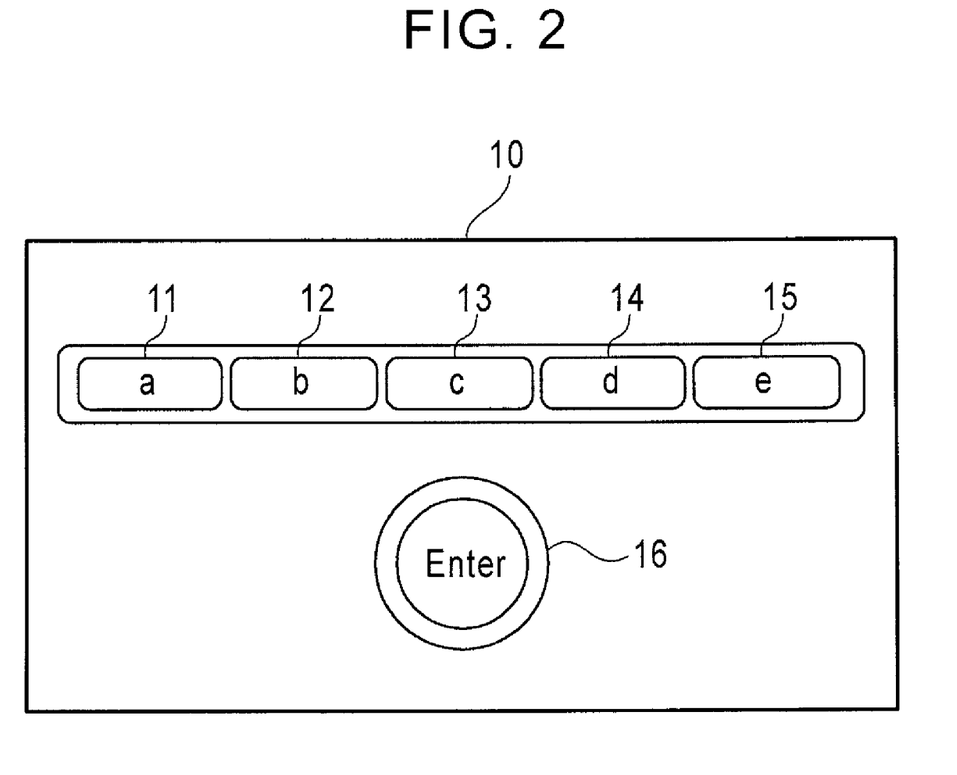
FIG. 2 illustrates an example of an operation unit according to an embodiment of the present invention.

The operation unit 10 is operated by a user for the purpose of selecting various kinds of information or inputting various instructions to the controller 20. FIG. 2 illustrates an example of the operation unit 10 of this embodiment. As shown in FIG. 2, the operation unit 10 includes plural (five in the illustrated example in FIG. 2) two-stage switches 11 to 15 (corresponding to a plurality of operators) and a rotary switch 16. The switches 11 to 15 can be vertically pressed down at two levels. The switch 16 can be vertically pressed down at one level and turned from side to side.

The two-stage switches 11 to 15 are arranged in a row with little space in a horizontal direction. Further, the two-stage switches 11 to 15 can be pressed down to a first level in response to a gentle vertical-pressing operation (as a light touch with a fingertip). With this structure, the two-stage switches 11 to 15 can be individually pressed down to the first level and in addition, can be pressed down to the first level in succession along with an operation of sliding a finger over the two-stage switches 11 to 15 in the horizontal direction and pressing the switches one after another. The term "press the switches down to the first level in succession" means to press a switch down to the first level just after a previous switch is shifted from a state of being pressed down to the first level to an unpressed state while sliding a finger over the two-stage switches 11 to 15.

In this embodiment, a map scale is selected through the operation of pressing any of the two-stage switches 11 to 15 down to the first level. Here, a state of being pressed down to the first level corresponds to the temporary selection of a scale. The two-stage switches 11 to 15 are each assigned with predetermined scale information in advance. For example, five different scales are assigned to the five two-stage switches 11 to 15 such that the scale decreases towards the leftmost switch. Hereinafter, the individual scale information assigned to the two-stage switches 11 to 15 is referred to as "operator-specific information". To select a map scale through an operation of pressing any of the two-stage switches 11 to 15 down to the first level corresponds to the selection of the operator-specific information assigned to the two-stage switch.

Further, in this embodiment, the selection of scale information is confirmed in response to an operation of pressing the operator-specific information down to the second level (corresponding to a confirmation operation), whereby the temporarily-selected scale information is confirmed. As described above, the two-stage switches 11 to 15 are configured with three identifiable operation states of the unpressed state in which no operation is applied, the temporary selected state in which the switch is pressed down to the first level, and the selection-confirmed state in which the switch is pressed down to the second level.

The rotary switch 16 is operated by a user to execute various operations other than the selection of a scale. For example, the user can scroll around the map continuously while arbitrarily changing the direction by pressing and turning the rotary switch 16. In addition, a cursor can be placed at a destination, for example, by pressing the rotary switch 16 after the operation of scrolling around the map.

The processing execution unit 21 executes predetermined processing using information set in the selected-information memory 22 (user-selected information). In this embodiment, the processing execution unit 21 carries out processing for displaying a map on the display unit 30 based on scale information set in the selected-information memory 22 (user-selected information). The selected-information memory 22 is a recording medium for storing scale information selected by a user operating the operation unit 10. The selected-information memory 22 is a nonvolatile memory. The retracted-information memory 27 is a temporary storage memory to which scale information (corresponding to already-selected information) stored in the selected-information memory 22 is temporarily retracted.

The operation state detection unit 23 detects three operation states (the unpressed state, the state of being pressed down to the first level (temporary selected state), and the state of being pressed down to the second level (selection-confirmed state)) for each of the two-stage switches 11 to 15 of the operation unit 10.

If the operation state detection unit 23 detects that any of the two-stage switches 11 to 15 is pressed down to the first level in an already processed state where the processing execution unit 21 is performing map display processing using scale information (already selected information) already set in the selected-information memory 22, the processing state change unit 24 retracts the already selected information in the selected-information memory 22 to the retracted-information memory 27. Then, the processing state change unit 24 selects operator-specific information assigned to the switch pressed down to the first level and sets the selected operator-specific information in the selected-information memory 22 to prompt the processing execution unit 21 to execute the map display processing using the operator-specific information. Hereinafter, the state in which the processing execution unit 21 executes the map display processing using new operator-specific information set in the selected-information memory 22 is referred to as the "new processing state".

If the operation state detection unit 23 detects that the switch pressed down to the first level out of the two-stage switches 11 to 15 is further pressed down to the second level from the first level, the selected-information confirmation unit 25 confirms the selection of the operator-specific information. To confirm the selection of the operator-specific information means to confirm the temporarily-selected scale information set in the selected-information memory 22 with the processing state change unit 24 as information applied to the processing execution unit 21. To elaborate, the selected-information confirmation unit 25 deletes the already selected information retracted to the retracted-information memory 27 to thereby confirm the temporarily-selected operator-specific information set in the selected-information memory 22 as new already-selected information. As a result, the new processing state is set as an already processed state. The selected-information confirmation unit 25 notifies the processing state change unit 24 and the state restoration unit 26 that the temporary selected state is shifted to the selection-confirmed state.

However, if the operation state detection unit 23 detects that, when the selected-information confirmation unit 25 stores the already selected information in the retracted-information memory 27 and the operator-specific information is set in the selected-information memory 22 to set a new processing state, the selection-confirmed state is not set through the confirmation operation for confirming the selection of the operator-specific information (or a notification that the selection is confirmed is not received from the selected-information confirmation unit 25) and the switch pressed down to the first level is released (unpressed state), the state restoration unit 26 restores the already processed state from the new processing state.

More specifically, if the operation state detection unit 23 detects that the switch pressed down to the first level is released, not pressed down to the second level, the already selected information retracted to the retracted-information memory 27 is set in the selected-information memory 22 again in place of the temporarily selected operator-specific information set in the selected-information memory 22 to thereby prompt the processing execution unit 21 to execute the map display processing using the already selected information again. As a result, the already processed state is restored to display the map on the display unit 30 at the original scale that was set before the operation of pressing any of the two-stage switches 11 to 15.

Figure 3:
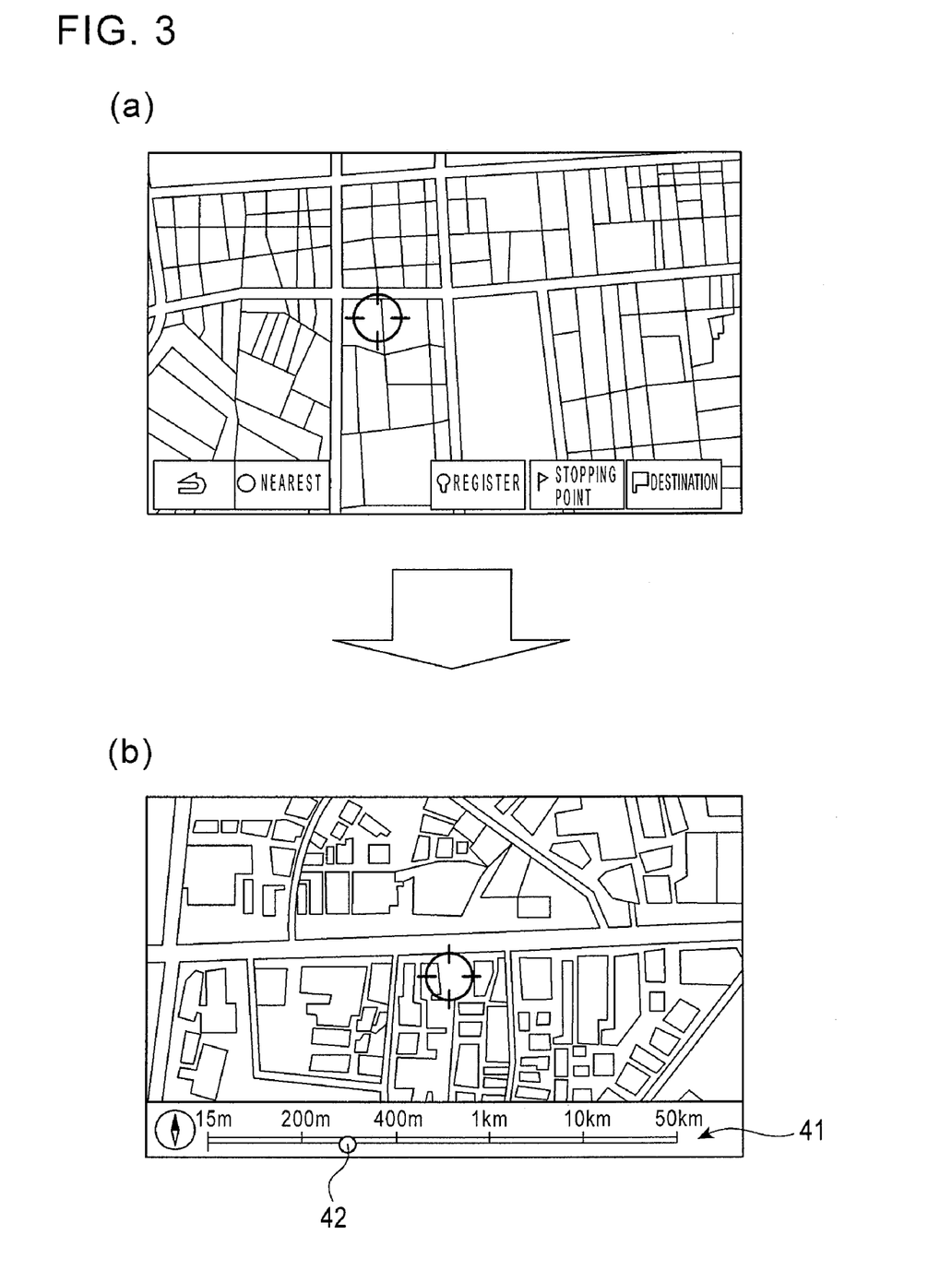
FIGS. 3A and 3B illustrate an example of an operation of switching a screen following an operation of a two-stage switch according to an embodiment of the present invention.

FIGS. 3A and 3B illustrate an example of an operation of switching a screen following the operation of pressing any of the two-stage switches 11 to 15. FIG. 3A shows a display state of the display unit 30 before the operation of pressing any of the two-stage switches 11 to 15. To be specific, in the state illustrated in FIG. 3A, the processing execution unit 21 executes the map display processing based on the already selected information set in the selected-information memory 22 to thereby display the map on the display unit 30 at a predetermined scale.

FIG. 3B shows a display state when the second-leftmost switch 12 out of the two-stage switches 11 to 15 is pressed down to the first level. If any of the two-stage switches 11 to 15 is pressed down to the first level, five scale levels selectable with the two-stage switches 11 to 15 are displayed in a lower area of the screen, and a mark 42 is displayed in a position on a scale bar 41 corresponding to the second switch 12 pressed down to the first level as shown in FIG. 3B. The mark 42 indicates that a scale is temporarily selected with the second switch 12. Further, the map displayed on the display unit 30 is switched to a map actually generated at the temporarily selected scale with the processing execution unit 21.

After the display screen has been switched to the screen as shown in FIG. 3B, if the second switch pressed down to the first level is further pressed down to the second level, the temporarily selected scale is confirmed. Thus, even if the second switch 12 pressed down to the second level is released, the display state shown in FIG. 3B is kept. This state is newly set as an already-processed state.

On the other hand, after the display screen has been switched to the screen as shown in FIG. 3B, if the second switch pressed down to the first level is released, not pressed down to the second level, the scale information set in the selected-information memory 22 is returned to the retracted-information memory 27 as the already selected information, with the result that the map displayed on the display unit 30 is switched back to the state in FIG. 3A. In other words, the map is displayed at the original scale as shown in FIG. 3A only by releasing a finger from the second switch 12.

In the case of sliding a finger over the plural two-stage switches 11 to 15 one after another, the restoration processing starts when one switch is shifted from the state of being pressed down to the first level to the unpressed state. In the next moment, however, an adjacent switch is pressed down to the first level. Thus, the map is displayed with the scale changing along with the operation of sliding a finger over the plural two-stage switches 11 to 15, not displayed at the original scale, in the user's eyes.

Figure 4:
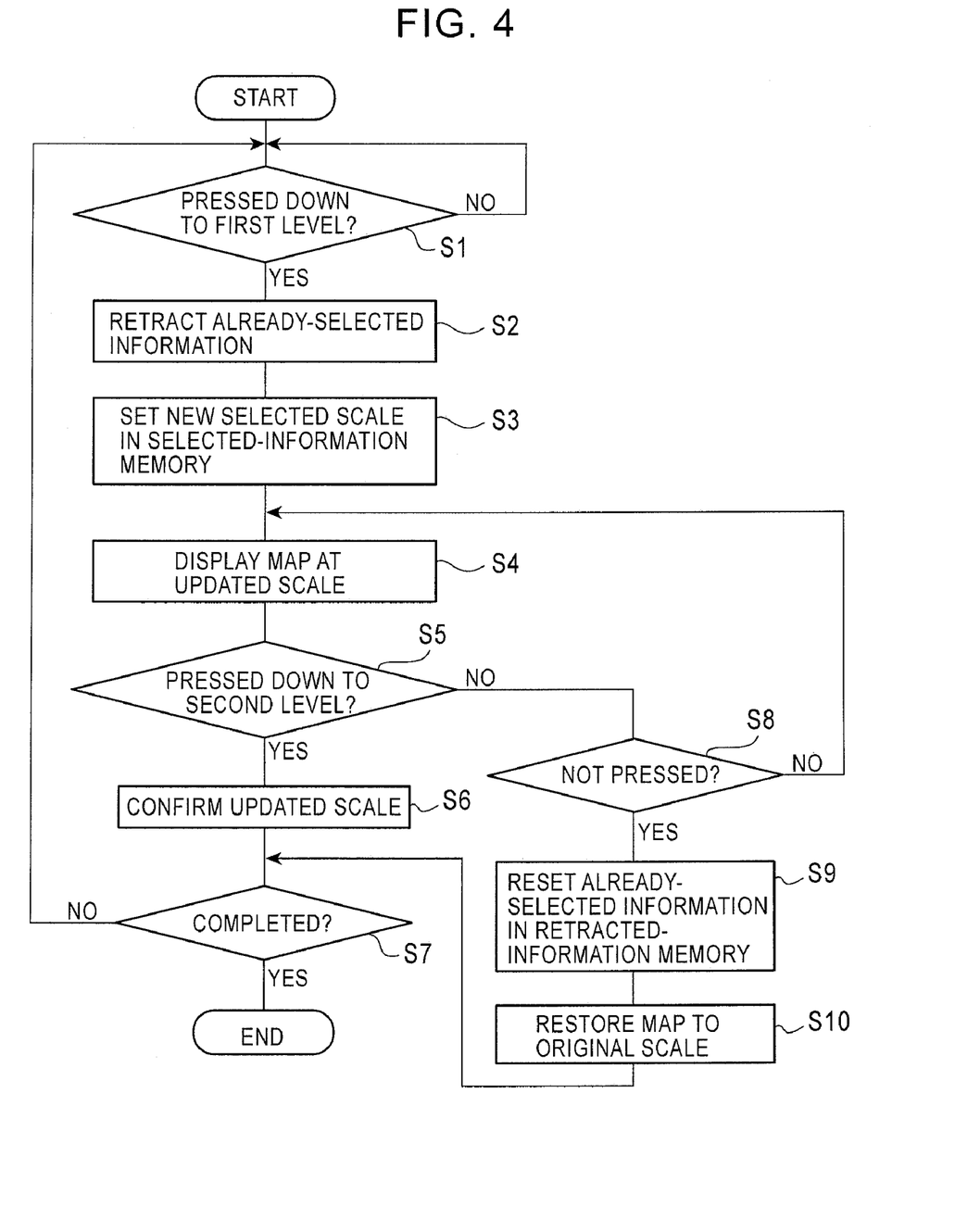
FIG. 4 is a flowchart of an example of a map scale selecting operation according to an embodiment of the present invention.

Next, the map scale selecting operation of the information processing apparatus 100 of this embodiment is described. FIG. 4 is a flowchart of an example of the map scale selecting operation of this embodiment. Here, as a premise for the operation in the flowchart of FIG. 4, the processing execution unit 21 displays a map on the display unit 30 at a scale preset by a user in accordance with already selected information stored in the selected-information memory 22.

In FIG. 4, the operation state detection unit 23 determines whether any of the plural two-stage switches 11 to 15 is pressed down to the first level (step S1). In this case, if the operation state detection unit 23 detects that any switch is pressed down to the first level, the processing state change unit 24 retracts the already selected information stored in the selected-information memory 22 to the retracted-information memory 27 (step S2). Further, the processing state change unit 24 stores operator-specific information assigned to the switch pressed down to the first level in the selected-information memory 22 in place of the already selected information (step S3). Then, the processing execution unit 21 performs map display processing using the new operator-specific information set in the selected-information memory 22 to display the map on the display unit 30 at the new scale (step S4).

Next, the operation state detection unit 23 determines whether the switch pressed down to the first level is further pressed down to the second level (step S5). If the operation state detection unit 23 detects that the switch is pressed down to the second level, the selected-information confirmation unit 25 confirms selection of the operator-specific information set in the selected-information memory 22, and confirms the state of the map displayed at the scale changed through the operation of pressing the switch down to the first level (step S6). After that, the operation state detection unit 23 determines whether an operation of terminating the map display processing is performed (step S7). If no terminating operation is performed, the processing returns to step S1.

If the operation state detection unit 23 does not detect that the switch is pressed down to the second level in step S5, then the operation state detection unit 23 determines whether the switch pressed down to the first level returns to the unpressed state (step S8). If the operation state detection unit 23 detects that the switch pressed down to the first level returns to the unpressed state, the state restoration unit 26 stores the already selected information retracted to the retracted-information memory 27 in the selected-information memory 22 again in place of the operator-specific information stored in the selected-information memory 22 (step S9). Then, the processing execution unit 21 performs the map display processing using the already selected information that is set in the selected-information memory 22 again, and displays the map on the display unit 30 at the original scale that was set before the operation of pressing any of the two-stage switches 11 to 15 (step S10).

On the other hand, if the operation state detection unit 23 detects that the switch pressed down to the first level does not return to the unpressed state, the processing returns to step S4. In other words, if the switch pressed down to the first level is kept at the first level, not being further pressed down to the second level nor released, the processing execution unit 21 continuously displays the map on the display unit 30 at the scale selected in response to the operation of pressing the switch down to the first level based on the operator-specific information set in the selected-information memory 22 through that period.

As described above in detail, in this embodiment, if the operation state detection unit 23 detects that any of the two-stage switches 11 to 15 is pressed down to the first level when the processing execution unit 21 is displaying the map using already selected information corresponding to a certain scale, the processing execution unit 21 executes the map display processing using new operator-specific information that is assigned to the pressed switch to thereby display the map at the new selected scale. After that, if the switch is not pressed down to the second level but released, the map is restored to the original scale.

Owing to the above, it is possible to actually view and confirm the map displayed at a different scale by pressing any switch down to the first level. Then, the map can be restored to the original scale simply by making the pressed switch unpressed (by releasing a finger from the switch). This makes it unnecessary to perform a troublesome operation to restore the original scale. Accordingly, in the case of displaying the map at a different scale when the map is displayed at a certain scale, the map can be easily restored to the original scale after that operation. In other words, if a user wants to check briefly the map displayed at a different scale, this operation can be easily performed. Further, if the user prefers the different scale to the current one, this scale can be confirmed in a simple manner.

In the above embodiment, the navigation system, the map display processing, and the scale are described as an example of the information processing apparatus 100, the predetermined processing, and the user-selected information, respectively. However, the present invention is not limited thereto. For example, the information processing apparatus 100 may be a music player, the predetermined processing may be music playback processing, and the user-selected information may be a target song for playback.

In this case, the music player may be either a device capable of inserting plural CDs in a changer, selecting and playing back any of the CDs, or a device capable of recording plural music files on a hard disk and selecting and playing back any song. Alternatively, the music player may be a device capable of being connected to a portable music player in a wired or wireless manner and selecting and playing back any song selected from plural music files recorded on the portable music player. As for a song selected by a user, a single desired song, a desired music album, or a playlist may be selected.

Next, described is an example where a user selects and plays back a desired song in, for example, the music player capable of recording plural music files on a hard disk and selecting and playing back any song. In this example, the processing execution unit 21 executes music playback processing using information set in the selected-information memory 22 (song information for identifying a user-selected music file).

If the operation state detection unit 23 detects that any of the plural two-stage switches 11 to 15 is pressed down to the first level in an already processed state in which the processing execution unit 21 is executing the music playback processing using music information already set in the selected-information memory 22 (already selected information), the processing state change unit 24 retracts the already selected information in the selected-information memory 22 to the retracted-information memory 27. Then, operator-specific information for identifying a music file assigned to the switch pressed down to the first level is set in the selected-information memory 22 to thereby prompt the processing execution unit 21 to execute the music playback processing using the operator-specific information. As a result, another song that is selected through the operation of pressing any switch down to the first level is played back in place of the original music that was played back before the operation of pressing the corresponding one of the two-stage switches 11 to 15.

If the operation state detection unit 23 detects that the switch pressed down to the first level is further pressed down to the second level, the selected-information confirmation unit 25 confirms the selection of the operator-specific information. As a result, the playback state of the selected other song is confirmed.

If the operation state detection unit 23 detects that, in the new processing state in which any switch is pressed down to the first level and another song is played back, the switch pressed down to the first level is released, not pressed down to the second level, the state restoration unit 26 performs processing for restoring the new processing state to the already processed state. To elaborate, the state restoration unit 26 sets the already selected information retracted to the retracted-information memory 27 in the selected-information memory 22 again in place of the operator-specific information set in the selected-information memory 22 to thereby prompt the processing execution unit 21 to perform the music playback processing using the already selected information again. As a result, the original song that was played back before the operation of pressing any of the two-stage switches 11 to 15 is played back again.

Here, when the processing state change unit 24 retracts the already selected information in the selected-information memory 22 to the retracted-information memory 27, information representing a playback time having elapsed at that point may be also stored in the retracted-information memory 27. Then, when the state restoration unit 26 returns the already selected information in the retracted-information memory 27 to the selected-information memory 22, the information about the playback elapsed time may be stored therein again. With this operation, in the case where the state restoration unit 26 restores the original already processed state, the original song can be played back from the point of time when any of the two-stage switches 11 to 15 was pressed.

Figure 5:
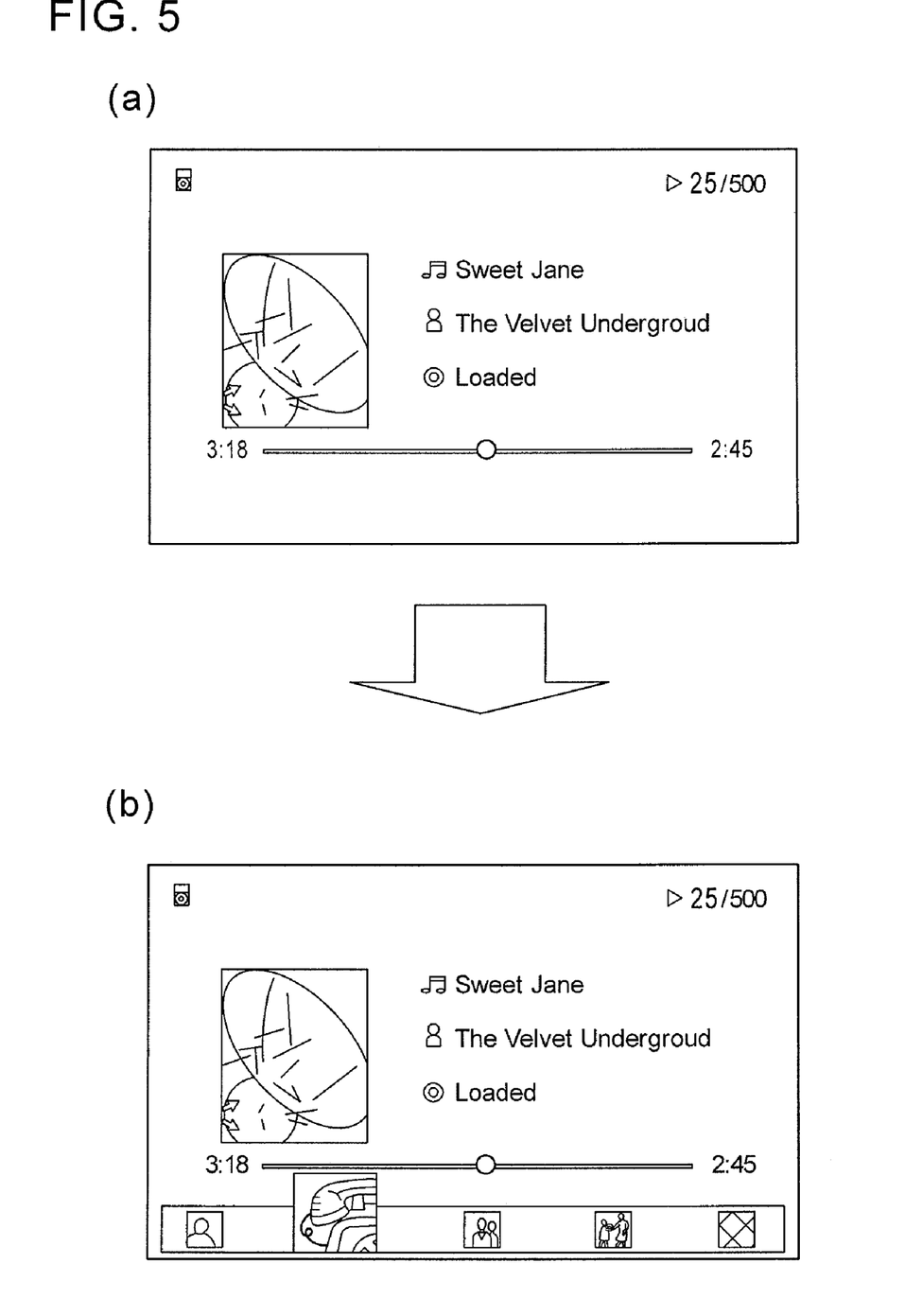
FIGS. 5A and 5B illustrate another example of an operation of switching a screen following an operation of a two-stage switch according to an embodiment of the present invention.

FIGS. 5A and 5B illustrate an example of an operation of switching a screen following an operation of any of the two-stage switches 11 to 15 in the described music player. FIG. 5A shows a display state of the display unit 30 before the operation of any of the two-stage switches 11 to 15. More specifically, in the state illustrated in FIG. 5A, the processing execution unit 21 performs music playback processing based on already selected information set in the selected-information memory 22 to thereby play back a predetermined song. On the left side of the screen, displayed is an image of a sleeve of a music album including the song being played back. On the right side of the screen, displayed are a name of the song being played back and a name of a singer thereof.

On the other hand, in the state illustrated in FIG. 5B, the second-leftmost switch 12 out of the two-stage switches 11 to 15 is pressed down to the first level. If any of the two-stage switches 11 to 15 is pressed down to the first level, as shown in FIG. 5B, a lower portion of the screen displays images of sleeves of music albums corresponding to five songs selectable by means of the two-stage switches 11 to 15. Among the five images of sleeves, the image of the sleeve corresponding to the second switch 12 pressed down to the first level is displayed at a larger scale than the other images.

In the illustrated example of FIG. 5B, the image of the sleeve displayed on the left side of the screen and the song name and singer name displayed on the right side of the screen are information assigned to the original song. However, information assigned to another song selected through the operation of pressing the second switch 12 down to the first level may be displayed instead. During the display operation shown in FIG. 5B (while the second switch 12 is being pressed down to the first level), the processing execution unit 21 plays back the song selected through the operation of pressing the second switch 12 down to the first level.

After the display screen has been switched to the one in FIG. 5B, if the second switch 12 pressed down to the first level is further pressed down to the second level, the selection of the song that is temporarily selected and played back is confirmed. As a result, even if the second switch 12 pressed down to the second level is released, the selection-confirmed song is continuously played back. In addition, the image of the sleeve displayed on the left side of the screen and the song name and singer name displayed on the right side of the screen are switched to information assigned to the selection-confirmed song.

On the other hand, after the display screen has been switched to the one in FIG. 5B, if the second switch 12 pressed down to the first level is released, not pressed down to the second level, the already selected information in the retracted-information memory 27 is stored in the selected-information memory 22 again to thereby return the display unit 30 to the state illustrated in FIG. 5A. Further, the song played back with the processing execution unit 21 is switched back to the original song that had been played back until the operation of pressing the switch. In other words, it is possible to restore the original song playback state before the operation of pressing the switch simply by releasing a finger from the second switch 12.

In the illustrated examples in FIGS. 5A and 5B, even if plural music files are recorded on the hard disk, a user is allowed to select only five songs. To that end, in the case of pressing any one of the two-stage switches 11 to 15, the above operation may be performed; in the case of sliding a finger over the two-stage switches 11 to 15 in the lateral direction, selectable songs (music files assigned to each of the two-stage switches 11 to 15) may be changed. For example, in the case of sliding a finger over the two-stage switches 11 to 15 to the right, the music files assigned to the two-stage switches 11 to 15 are changed to five subsequent ones. On the other hand, in the case of sliding a finger over the two-stage switches 11 to 15 to the left, the music files assigned to the two-stage switches 11 to 15 are changed to five previous ones.

Next, described is an example where a user searches for a desired song in the music player capable of recording plural music files on a hard disk and selecting and playing back an arbitrary song. In this example, plural songs recorded on the hard disk are sorted by name and grouped into five search lists for illustrative purposes. By pressing any of the two-stage switches 11 to 15 down to the first level, any search list is temporarily selected, and the selection thereof is confirmed through the operation of pressing the switch down to the second level. After that, the rotary switch 16 is turned to the right or left to thereby choose any one of plural songs belonging to the selection-confirmed search list, and the selection of the song is confirmed in response to the operation of pressing the rotary switch 16.

In this case, the processing execution unit 21 displays the search list on the display unit 30 using information set in the selected-information memory 22 (information for identifying the user-selected search list) and in addition, plays back plural songs belonging to the search list one by one. Here, the processing execution unit 21 may play back the plural songs one after another for 5 seconds from the beginning of each song. Further, the rotary switch 16 is turned to the right or left while any of the two-stage switches 11 to 15 is pressed down to the first level to thereby allow a user to freely choose a song to be played back with the processing execution unit 21 from the search list being selected in response to the operation of pressing any of the two-stage switches 11 to 15 down to the first level.

If the operation state detection unit 23 detects that, in the already processed state where the processing execution unit 21 is performing the list display processing and the music playback processing using the information about the search list already set in the selected-information memory 22 (already selected information), any of the plural two-stage switches 11 to 15 is pressed down to the first level, the processing state change unit 24 retracts the already selected information in the selected-information memory 22 to the retracted-information memory 27. Then, operator-specific information for identifying a search list assigned to the switch pressed down to the first level is set in the selected-information memory 22 to thereby prompt the processing execution unit 21 to perform the list display processing and the music playback processing using the operator-specific information.

With the above operation, the display unit 30 displays another search list selected through the operation of pressing any of the two-stage switches 11 to 15 down to the first level in place of the original search list that had been displayed until the operation of pressing any switch. Further, plural songs belonging to the other search list selected through the operation of pressing any of the two-stage switches 11 to 15 down to the first level are played back one after another in place of the plural songs in the original search list that had been played back one after another until the operation of pressing any switch.

If the operation state detection unit 23 detects that the switch pressed down to the first level is further pressed down to the second level, the selected-information confirmation unit 25 confirms the selection of the operator-specific information. As a result, the selection of the search list is confirmed. From then on, an arbitrary song can be selected from the search list with the rotary switch 16.

If the operation state detection unit 23 detects that, when any switch is pressed down to the first level, the switch pressed down to the first level is released, not pressed down to the second level, the state restoration unit 26 performs processing for restoring the already processed state. To be specific, the state restoration unit 26 sets the already selected information retracted to the retracted-information memory 27 in the selected-information memory 22 again in place of the operator-specific information set in the selected-information memory 22. As a result, the processing execution unit 21 displays the original search list identified by the already selected information on the display unit 30 again as well as plays back the plural songs belonging to the original search list again.

Here, when the processing state change unit 24 retracts the already selected information in the selected-information memory 22 to the retracted-information memory 27, song information representing which song in the search list is played back at that point may be also stored in the retracted-information memory 27. Then, when the state restoration unit 26 returns the already selected information in the retracted-information memory 27 to the selected-information memory 22, the song information may be stored therein again. With this operation, in the case where the state restoration unit 26 restores the original already processed state, the original song can be played back from the point of time when any of the two-stage switches 11 to 15 was pressed.

Figure 6:
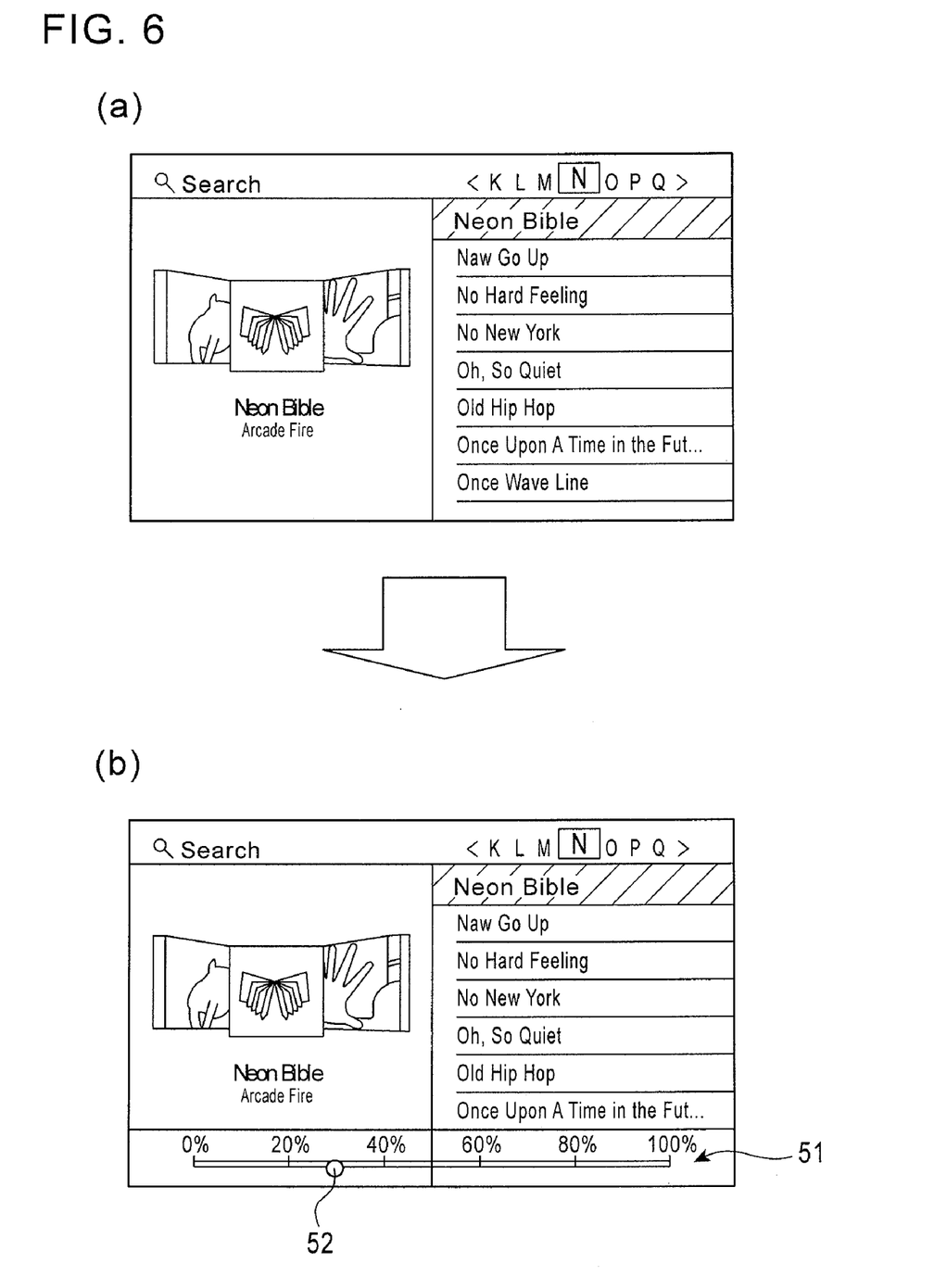
FIGS. 6A and 6B illustrate still another example of an operation of switching a screen following an operation of a two-stage switch according to an embodiment of the present invention.

FIGS. 6A and 6B illustrate an example of an operation of switching a screen following an operation of any of the two-stage switches 11 to 15 in the described music player. FIG. 6A shows a display state of the display unit 30 before the operation of any of the two-stage switches 11 to 15. More specifically, in the state illustrated in FIG. 6A, the processing execution unit 21 displays a search list on the right side of the screen based on already selected information set in the selected-information memory 22. At this time, the processing execution unit 21 plays back plural songs belonging to the search list one after another.

On the other hand, in the state illustrated in FIG. 6B, the second-leftmost switch 12 out of the two-stage switches 11 to 15 is pressed down to the first level. If any of the two-stage switches 11 to 15 is pressed down to the first level, as shown in FIG. 6B, a lower portion of the screen displays a percentage bar 51 indicating each of five search lists selectable by means of the two-stage switches 11 to 15. In addition, a mark 52 is displayed on the percentage bar 51 corresponding to the second switch 12 pressed down to the first level. The mark indicates that the search list is temporarily selected with the second switch 12.

Further, songs in the search list displayed on the right side of the screen are switched to songs belonging to the temporarily selected search list (in the illustrated example in FIG. 6B, displayed songs are not switched because the same search list as in FIG. 6A is selected with the second switch 12). During the display operation shown in FIG. 6B (while the second switch 12 is being pressed down to the first level), the processing execution unit 21 sequentially plays back plural songs belonging to the search list selected through the operation of pressing the second switch 12 down to the first level.

After the display screen has been switched to the one in FIG. 6B, if the second switch 12 pressed down to the first level is further pressed down to the second level, the selection of the search list that has been temporarily selected is confirmed. As a result, even if the second switch 12 pressed down to the second level is released, the selection-confirmed search list is continuously displayed. In addition, any song can be selected from the selection-confirmed search list by means of the rotary switch 16.

On the other hand, after the display screen has been switched to the one in FIG. 6B, if the second switch 12 pressed down to the first level is released, not pressed down to the second level, the already selected information in the retracted-information memory 27 is stored in the selected-information memory 22 again to thereby return the display unit 30 to the state illustrated in FIG. 6A. Further, the song played back with the processing execution unit 21 is switched back to the song belonging to the original search list that had been played back until the operation of pressing the switch. In other words, it is possible to restore the original state before the operation of pressing the switch simply by releasing a finger from the second switch 12.

Further, the above embodiment describes the case of using hardware switches like the two-stage switches 11 to 15 as an example of plural operators in the operation unit 10. However, the present invention is not limited thereto. For example, plural image switches displayed on a display with a touch panel (corresponding to the operation unit 10) may be used as plural operators. In the case of using a pressure-sensitive touch panel, the touch panel can distinguish between light touch (an operation of pressing a switch down to the first level) and hard touch (an operation of pressing a switch down to the second level) similar to the two-stage switches 11 to 15.

In addition, the above embodiment describes the case of using the two-stage switches 11 to 15 capable of being pressed down to the first level and the second level as an example of plural operators in the operation unit 10. However, the present invention is not limited thereto. For example, the plural operators in the operation unit 10 may be one-stage switches capable of being pressed down to a first level in one direction. In this case, a pressed state of each one-stage switch corresponds to the state of each of the two-stage switches 11 to 15 pressed down to the first level. Confirmation of the selection is executed with another operator provided independently of the one-stage switches (for example, the operation of pressing the rotary switch 16).

Also in the case where one-stage switches are employed as the plural operators, the touch panel can be utilized. In a multi-touch optical touch panel, information can be input by pressing plural portions in the touch panel at a time. For example, five switches that realize the state of being pressed down to the first level are displayed in line on the display with a touch panel. In addition, a selection-confirming switch is displayed in a different operation area. If the selection-confirming switch is operated while any of the five switches is touched, a temporary selected state can be shifted to a selection-confirmed state.

Figure 7:
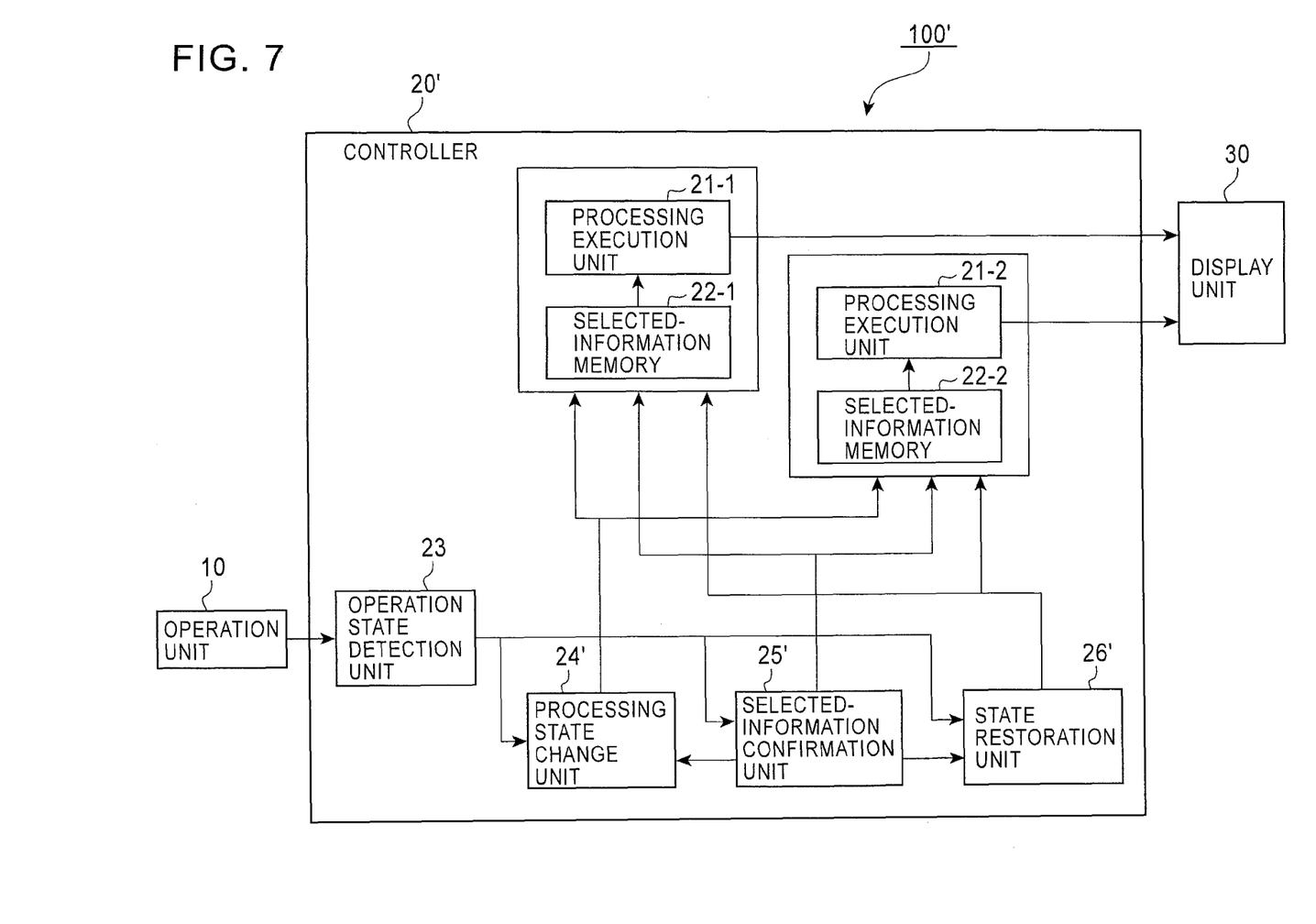
FIG. 7 is a block diagram of another example of an information processing apparatus according to an embodiment of the present invention.

Further, in this embodiment, the temporary selected state is realized by retracting already selected information stored in the selected-information memory 22 to the retracted-information memory 27, and the already processed state is restored by returning the retracted already selected information to the selected-information memory 22. However, the present invention is not limited thereto. For example, as shown in FIG. 7, two pairs of the processing execution unit 21 and the selected-information memory 22 may be prepared, one of which is used to set the temporary selected state.

For example, if any of the two-stage switches 11 to 15 is pressed down to the first level while a first processing execution unit 21-1 performs music playback processing using already selected information set in a first selected information memory 22-1, operator-specific information corresponding to the switch is set in a second selected information memory 22-2 and music playback processing is executed with a second processing execution unit 21-2. At this time, the first processing execution unit 21-1 stops the playback processing temporarily.

After that, if the switch is pressed down to the second level, the already selected information stored in the first selected information memory 22-1 is deleted, and the temporary selected state is shifted to the selection-confirmed state. After the selection has been confirmed, the first processing execution unit 21-1 and the first selected information memory 22-1 are used to set the temporary selected state. On the other hand, if the switch is released, the operator-specific information stored in the second selected information memory 22-2 is deleted to stop the playback processing with the second processing execution unit 21-2 as well as to restart the playback processing with the first processing execution unit 21-1.

Further, the above embodiment describes the case where the state restoration unit 26 performs the restoration processing each time the switch pressed down to the first level is released. However, the present invention is not limited thereto. For example, even when the switch pressed down to the first level is released, if the operation state detection unit 23 detects that another switch is pressed down to the first level within a predetermined period from then (i.e., detects a sliding operation), the state restoration unit 26 can skip the processing for restoring the already processed state.

Moreover, although the above embodiment describes the map display processing, the music playback processing, and the song search processing as examples of the predetermined processing, the present invention is not limited thereto. For example, the present invention is applicable to such a case that a user selects a desired channel and receives broadcast thereof with a broadcast receiver capable of receiving television broadcast or radio broadcast.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An information processing apparatus having a function of executing predetermined processing using selected information, comprising:
    an operation unit including a plurality of operators having at least two identifiable operation states of a pressed state and an unpressed state;
    an operation state detection unit configured to detect the at least two operation states for each of the plurality of operators in the operation unit;
    a processing state change unit configured to select operator-specific information assigned to an operator in the pressed state if the operation state detection unit detects that one of the plurality of operators is placed into the pressed state during an already processed state in which the predetermined processing is executed using already selected information, and execute the predetermined processing using the selected operator-specific information to change the already processed state to a new processing state; and
    a state restoration unit configured to reselect the already selected information if the operation state detection unit detects that, when the processing state change unit sets the new processing state, a selection-confirmed state is not set by a confirmation operation and the operator in the pressed state is placed into the unpressed state, and execute the predetermined processing using the already-selected information to restore the already processed state from the new processing state, wherein the confirmation operation is configured to confirm a selected state of the operator specific information by newly setting the selected operator-specific information as the already selected information and continuing to execute the predetermined processing using the selected state.

2. The information processing apparatus according to claim 1, wherein the plurality of operators in the operation unit are two-stage switches capable of being pressed at two levels in one direction, a state of being pressed down to a first level is the pressed state, and a state of being pressed down to a second level is the selection-confirmed state.

3. The information processing apparatus according to claim 2, wherein the plurality of operators are arranged close to one another in a direction perpendicular to the one direction.

4. The information processing apparatus according to claim 3, wherein even in the case where the operation state detection unit detects that, when the processing state change unit sets the new processing state, the selection-confirmed state is not set through the confirmation operation and the operator in the pressed state is placed into the unpressed state, if the operation state detection unit detects that another operator of the plurality of operators is placed into the pressed state within a predetermined period from the detection of the unpressed state, the state restoration unit does not perform processing for restoring the already processed state from the new processing state.

5. The information processing apparatus according to claim 1, wherein the plurality of operators in the operation unit are one-stage switches capable of being pressed at one level in one direction, a state of being pressed is the pressed state, and a pressed state of an operator other than the plurality of operators, which is provided for the confirmation operation, is the selection-confirmed state.

6. The information processing apparatus according to claim 1, further comprising:
    a selected-information memory for storing selected information used for the predetermined processing; and
    a retracted-information memory for temporarily retracting already-selected information being already stored in the selected-information memory,
    wherein if the operation state detection unit detects that, in the already processed state in which the predetermined processing is being executed using the already-selected information being already stored in the selected-information memory, one of the plurality of operators is placed into the pressed state, the processing state change unit retracts the already-selected information to the retracted-information memory and stores the operator-specific information in the selected-information memory to execute the predetermined processing to change the already processed state to the new processing state, and
    if the operation state detection unit detects that, when the processing state change unit sets the new processing state, the selection-confirmed state is not set through the confirmation operation and the operator in the pressed state is placed into the unpressed state, the state restoration unit stores the already selected information retracted to the retracted-information memory in the selected-information memory to execute the predetermined processing to restore the already processed state from the new processing state.

7. The information processing apparatus according to claim 1, further comprising:
    a plurality of sets of processing execution units for executing the predetermined processing and selected-information memories for storing selected information used in the processing execution units,
    wherein if the operation state detecting unit detects that one of the plurality of operators is placed into the pressed state in the already processed state during which one processing execution unit executes the predetermined processing using the already selected information being already stored in one selected-information memory, the processing state change unit stops the predetermined processing of the one processing execution unit and stores the operator-specific information in another selected-information memory to prompt another processing execution unit to execute the predetermined processing to change the already processed state to the new processing state, and if the operation state detection unit detects that, when the processing state change unit sets the new processing state, the selection-confirmed state is not set through the confirmation operation and the operator in the pressed state is placed into the unpressed state, the state restoration unit deletes the operator-specific information stored in the other selected-information memory to stop the predetermined processing of the other processing execution unit and restarts the predetermined processing of the one processing execution unit to restore the already processed state from the new processing state.

8. The information processing apparatus according to claim 1, wherein the predetermined processing is map display processing, and the already selected information and the operator-specific information used for the predetermined processing are information about a scale of a displayed map.

9. The information processing apparatus according to claim 1, wherein the predetermined processing is broadcast reception processing, and the already selected information and the operator-specific information used for the predetermined processing are information about a broadcast reception channel.

10. The information processing apparatus according to claim 1, wherein the predetermined processing is music playback processing, and the already selected information and the operator-specific information used for the predetermined processing are information about a target song for playback.

11. An information selecting method for selecting information desired to be used for predetermined processing in an information processing apparatus including an operation unit including a plurality of operators having at least two identifiable operation states of a pressed state and an unpressed state, and having a function of executing the predetermined processing using selected information;

a first act of determining whether one of the plurality of operators undergoes a pressing operation and is placed into the pressed state during an already processed state in which the predetermined processing is executed using already selected information, a second act of selecting, if it is detected in the first act that one of the operators is placed into the pressed state, operator-specific information assigned to the operator in the pressed state and executing the predetermined processing using the selected operator-specific information;

a third act of determining whether a confirmation operation for confirming a selected state of the operator-specific information selected in the second act is performed following the pressing operation applied to the operator to put the operator into the pressed state, and whether the operator in the pressed state returns to the unpressed state;

a fourth act of confirming, if it is detected in the third act that the confirmation operation is performed, a selected state of the operator-specific information and newly setting the operator-specific information as the already selected information; and a fifth act of performing, if it is detected in the third act that the operator in the pressed state returns to the unpressed state, the already selected state and executing the predetermined processing using the already selected information.

12. The information selecting method according to claim 11, wherein the plurality of operators in the operation unit are two-stage switches capable of being pressed at two levels in one direction, a state of being pressed down to a first level is the pressed state, and a state of being pressed down to a second level is the selection-confirmed state.

13. The information selecting method according to claim 12, wherein the plurality of operators are arranged close to one another in a direction perpendicular to the one direction.

14. The information selecting method according to claim 13, further comprising:

a sixth act of cancelling processing for restoring the already-executed processing if it is detected that another operator of the plurality of operators is placed into the pressed state within a predetermined period from the detection of the unpressed state even in the case where it is detected that the selected state of the operator-specific information is not confirmed through the confirmation operation and the operator in the pressed state is placed into the unpressed state.

15. The information selecting method according to claim 11, wherein the plurality of operators in the operation unit are one-stage switches capable of being pressed at one level in one direction, a state of being pressed is the pressed state, and a pressed state of an operator other than the plurality of operators, which is provided for the confirmation operation, is the selection-confirmed state.

16. The information selecting method according to claim 11, wherein the information processing apparatus further includes:

a selected-information memory for storing selected information used for the predetermined processing; and a retracted-information memory for temporarily retracting already-selected information being already stored in the selected-information memory, the information selecting method further comprises:

a seventh act of retracting the already-selected information to the retracted-information memory and storing the operator-specific information in the selected-information memory to execute the predetermined processing to change the already processed state to the new processing state if it is detected that, in the already processed state in which the predetermined processing is being executed using the already-selected information being already stored in the selected-information memory, another of the plurality of operators is placed into the pressed state; and an eighth act of storing the already selected information retracted to the retracted-information memory in the selected-information memory to execute the predetermined processing to restore the already processed state from the new processing state if it is detected that, when the new processing state is set, the selection-confirmed state is not set through the confirmation operation and the operator in the pressed state is placed into the unpressed state.

17. The information selecting method according to claim 11, wherein the information processing apparatus further includes:
- a plurality of sets of processing execution units for executing the predetermined processing and selected-information memory for storing selected information used in the processing execution units, and the information selecting method further comprises:
- a ninth act of performing, if it is detected that one of the plurality of operators is placed into the pressed state during the already processed state in which one processing execution unit executes the predetermined processing using the already selected information being already stored in one selected-information memory, the operations including stopping the predetermined processing of the one processing execution unit and storing the operator-specific information in another selected-information memory to prompt another processing execution unit to execute the predetermined processing to change the already processed state to the new processing state; and
- a tenth act of deleting the operator-specific information stored in the other selected-information memory to stop the predetermined processing of the other processing execution unit and restarting the predetermined processing of the one processing execution unit to restore the already processed state from the new processing state if it is detected that, when the new processing state is set, the selected state of the operation-specific information is not set through the confirmation operation and the operator in the pressed state is placed into the unpressed state.

18. The information selecting method according to claim 11, wherein the predetermined processing is map display processing, and the already selected information and the operator-specific information used for the predetermined processing are information about a scale of a displayed map.

19. The information selecting method according to claim 11, wherein the predetermined processing is broadcast reception processing, and the already selected information and the operator-specific information used for the predetermined processing are information about a broadcast reception channel.

20. The information selecting method according to claim 11, wherein the predetermined processing is music playback processing, and the already selected information and the operator-specific information used for the predetermined processing are information about a target song for playback.

* * * * *